(12) United States Patent
Artemenko et al.

(10) Patent No.: US 10,116,061 B2
(45) Date of Patent: Oct. 30, 2018

(54) BEAM STEERABLE COMMUNICATION APPARATUS

(71) Applicant: LIMITED LIABILITY COMPANY "RADIO GIGABIT", Nizhny Novgorod (RU)

(72) Inventors: Aleksey Andreevich Artemenko, Nizhniy Novgorod (RU); Roman Olegovich Maslennikov, Nizhniy Novgorod (RU)

(73) Assignee: LIMITED LIABILITY COMPANY "RADIO GIGABIT", Nizhny Novgorod (RU)

( * ) Notice: Subject to any disclaimer, the term of this patent is extended or adjusted under 35 U.S.C. 154(b) by 86 days.

(21) Appl. No.: 15/342,537

(22) Filed: Nov. 3, 2016

(65) Prior Publication Data

US 2017/0062948 A1    Mar. 2, 2017

Related U.S. Application Data

(63) Continuation of application No. PCT/RU2015/000278, filed on Apr. 29, 2015.

(30) Foreign Application Priority Data

May 6, 2014    (RU) ................................ 2014117983

(51) Int. Cl.
    *H01Q 19/17*    (2006.01)
    *H01Q 19/08*    (2006.01)
    (Continued)

(52) U.S. Cl.
    CPC .......... *H01Q 19/08* (2013.01); *H01Q 1/2283* (2013.01); *H01Q 1/38* (2013.01); *H01Q 3/245* (2013.01);
    (Continued)

(58) Field of Classification Search
    CPC ........ H01Q 19/08; H01Q 1/2283; H01Q 1/38; H01Q 3/245; H01Q 3/40; H01Q 9/065; H01Q 25/007; H04B 7/0617
    See application file for complete search history.

(56) References Cited

U.S. PATENT DOCUMENTS

2013/0314280 A1*  11/2013  Maltsev ............... H01Q 3/34
                                                    342/368

FOREIGN PATENT DOCUMENTS

EP        0427201 A2      5/1991
WO     2014011087 A1      1/2014

OTHER PUBLICATIONS

International Search Report and Written Opinion with regard to PCT/RU2015/000278 (dated Oct. 12, 2015).

(Continued)

*Primary Examiner* — Dameon E Levi
*Assistant Examiner* — David Lotter
(74) *Attorney, Agent, or Firm* — BCF LLP

(57) ABSTRACT

Disclosed is a beam steerable communication apparatus comprising a focusing element with a focal plane, a plurality of antenna elements disposed on the focal plane of the focusing element, a beamforming network which has a plurality of antenna ports and a plurality of beamforming ports, at least one radio frequency transceiver capable to control the phase of carrier frequency signals on its independent outputs, and a baseband modem, wherein each antenna port of the beamforming network is coupled to at least one antenna element, each beamforming port of the beamforming network is coupled to an independent transceiver output, and the phase distribution law formed on the beamforming ports is determined by a baseband modem control commands to the transceivers, said phase distribution law is to combine or distribute signal power on all beamforming ports from or to at least one antenna port of the (Continued)

beamforming network, wherein each radio frequency transceiver includes at least a phase shifter, a Tx/Rx switch, LNA, PA, up and down-conversion mixers, LO generation circuit, receive power combining and transmit power distribution schemes. The technical result of the invention is in the capability of providing efficient beam steering with high gain antennas with all the prospect features of phased antenna arrays, such as the ability to combine/distribute signal power between several RF amplifiers, thus, facilitating linearity requirements and increasing an output power of a transmitter. The present invention can be used, without limitations, in radio relay point-to-point communication systems, e.g. for forming backhaul networks of cellular mobile communication, in car radars and other radars, in local and personal communication systems, in satellite and intersatellite communication systems, etc.

19 Claims, 6 Drawing Sheets

(51) Int. Cl.
*H01Q 3/24* (2006.01)
*H01Q 3/40* (2006.01)
*H01Q 25/00* (2006.01)
*H01Q 1/22* (2006.01)
*H01Q 1/38* (2006.01)
*H01Q 9/06* (2006.01)
*H04B 7/06* (2006.01)

(52) U.S. Cl.
CPC ............... *H01Q 3/40* (2013.01); *H01Q 9/065* (2013.01); *H01Q 25/007* (2013.01); *H04B 7/0617* (2013.01)

(56) References Cited

OTHER PUBLICATIONS

Cetinoneri et al., "An 8×8 Butler Matrix in 0.13-um CMOS for 5-6-GHz Multibeam Applications", IEEE Transactions on Microwave Theory and Techniques, 2011, vol. 59, No. 2, pp. 295-301.
Cohen et al., "A thirty two element phased-array transceiver at 60GHz with RF-IF conversion block in 90nm flip chip CMOS process", IEEE Radio Frequency Integrated Circuits Symposium, 2010, pp. 457-460.

\* cited by examiner

BEAM STEERABLE COMMUNICATION APPARATUS

CROSS-REFERENCE

The present application claims convention priority to Russian Utility Patent Application No. 2014117983, filed on May 6, 2014, entitled "BEAM STEERABLE COMMUNICATION APPARATUS". This application is incorporated by reference herein in its entirety. The present application is a continuation of International Patent Application no. PCT/RU2015/000278, filed on Apr. 29, 2015, entitled "BEAM STEERABLE COMMUNICATION APPARATUS". This application is incorporated by reference herein in its entirety.

FIELD OF THE INVENTION

The present invention relates to the field of communication systems, more particularly, to novel high data rate communication apparatus with an antenna system capable to electronic beam steering. The disclosed apparatus can be effectively used in various applications of millimeter wave radio communication systems, such as radio relay point-to-point communication systems and backhaul networks of mobile cellular communications, radars, satellite and intersatellite communication systems, local and personal communication systems, etc.

BACKGROUND ART

The demand for high data throughput leads to development and utilization of various novel radio communication systems operating in the millimeter wave range. It is associated, on the one hand, with a wide frequency bandwidth available for use in said range, and on the other hand, with significant technological advances made over the past few decades, allowing to create modern, effective and cost-efficient (in terms of large-scale production) transceivers operating in frequency ranges from 30 GHz to over 100 GHz. Modern millimeter wave radio communication systems include, without limitation, point-to-point and point-to-multipoint communications, car radars, wireless local area communication networks, imaging and surveillance systems, etc.

The effectiveness of millimeter wave communication systems is determined largely by characteristics of antennas used in said systems. Such antennas generally should have a high gain value, and consequently, should form a narrow radiation pattern beam. In this case, the antennas provide effective (i.e. with maximum throughput) signal transmission over long distances.

The requirement for high gain value is determined by a small wavelength of radiation in millimeter wave frequency range, which leads to difficulties in transmitting a signal over long distances using antennas with insufficient gain values. Furthermore, in said frequency range, the effect of weather conditions and athmospheric absorption is high (e.g., in the frequency range of about 60 GHz, the effect of oxygen spectral line absorption is high, leading to additional signal attenuation of 11 dB/km). This absorption can be compensated only by using high gain antenna systems since the emitted power level is generally limited by the regulation requirements and transceiver performance.

However, the use of antennas with a narrow radiation pattern beam involves difficulties related to antenna alignment and probability of connection refuse in case of even small orientation changes of the antenna mounting structure. It is also important to provide automatic initial alignment in the system deployment procedure that reduces the deployment time and costs. In order to provide automatic alignment of the beam direction in a certain continuous angle range (with the width of several main radiation pattern beams) at short time without the need of special staff service, aperture antennas have to provide electronic beam steering capabilities. In other millimeter wave applications, such as radars or imaging systems electronic beam steering feature is also needed in order to exclude mechanical rotation motors and to improve processing time and system endurance.

Traditionally in lower frequency ranges to resolve the above-mentioned problem of providing electronic beam steering, phased antenna arrays are used. With the evolution of semiconductor technology such kind of antenna arrays became feasible even in millimeter wave range. For instance, there are several companies and research groups around the world who are developing or already supplying MMIC receivers, transmitters, and transceivers in 60 GHz range for the new generation of Wi-Fi systems supporting IEEE 802.11ad standard. These MMIC transceivers have up to 8-32 independent outputs with the controlled phase of a carrier signal [see, for example, Cohen, E.; Jakobson, C.; Ravid, S.; Ritter, D. "A thirty two element phased-array transceiver at 60 GHz with RF-IF conversion block in 90 nm flip chip CMOS process"//IEEE Radio Frequency Integrated Circuits Symposium (RFIC), 2010]. Consequently, a phased antenna array of 8-32 elements can be realized. Classical representation of phased array system is shown in FIG. 1. It is important that any beam position in a continuous angle range can be formed depending on the phases on each antenna element provided by phase shifters, thus, this system is capable for adaptive beam scanning Another prior art antenna array system (known from Cetinoneri B.; Atesal Y. A.; Rebeiz G. M., "An 8 8 Butler Matrix in 0.13-um CMOS for 5-6-GHz Multibeam Applications"//IEEE Transactions on microwave theory and techniques, Vol. 59, No. 2, February 2011) is shown in FIG. 2. It is based on single transceiver, a switching system and a Butler matrix. The Butler matrix is a type of passive reciprocal beam-forming networks and it has N switched inputs and N phased outputs. Depending on which of N inputs is accessed, the predefined phase law is formed on all matrix outputs and, thus, antenna beam is steered in a specific direction in one plane. Other important properties of a Butler matrix include:
1. Switched inputs are isolated from each other;
2. Signal phases on N outputs are linear with respect to position, so beam is tilted off main axis;
3. None of the inputs provides a broadside beam;
4. The phase increment between the outputs depends on which input is used.

Described switched-beam antenna array apparatus with a beamforming network is considered as the closest prior art for the current invention.

In the example shown in FIG. 2 matrix size is 8 by 8 that allows forming 8 beams in different neighboring directions. This communication apparatus is beam-switching rather than adaptive beam-scanning system shown in FIG. 1. However, the advantage is that it requires only one transceiver. Other matrix and antenna array size can be used, for example, N=4 or N=16.

One practical realization of an 8 by 8 Butler matrix is shown in FIG. 3. It includes 90° hybrids (or 3 dB couplers), fixed phase shifters, and crossovers. All these elements are known from the prior art and can be used for millimeter wave applications. For example, 90° hybrids can be realized as branchline couplers, Lange couplers, or other coupled line couplers, or in the case of waveguide, as the Riblett coupler.

It is well known that in both described antenna arrays the distance between antenna elements should be about half of an operating wavelength to eliminate grating lobes in the radiation pattern. That requirement significantly limits the aperture size of the array and, thus, a gain. For instance, 60 GHz or 70/80 GHz radio relay systems require the gain of 35-43 dBi that can be provided with approximately 1000-10000 antenna elements in the array. Such large-scale millimeter wave antenna arrays are not practical nowadays due to different technological constrains.

Another way is to use large aperture beam-switching antenna systems. Beam scanning in those antenna systems is achieved by a switched array disposed in a focal plane of a reflector or a lens. Known configurations of millimeter wave aperture antennas providing high gain and electronic beam steering include different reflector antennas (e.g., parabolic and Cassegrain antennas) and various types of lens antennas (e.g. thin lenses with separated feed, Fresnel lenses, Luneburg lenses, artificial lenses from reflectarrays, integrated lens antennas). In that case there is no limitations on antenna gain but the scanning efficiency is quite low. For instance, there is a small number of beam positions and consequently, limited beam scanning range, and also high losses in the switching system. Another important limitation comparing with phased antenna arrays is that the switched-beam aperture antennas are not able to combine powers from different antenna elements in space (only one element in a time moment is active). It leads to additional challenge with RF system linearity or to the need of decreasing the transmitting signal power.

Therefore, there is a need for a communication apparatus providing high antenna gain and effective beam scanning with low additional loss and capability to combine power from different antenna elements without RF linearity or transmitting power degradation. Achieving of said objects results in increasing of the effectiveness of millimeter wave communication systems in terms of maximum throughput and communication distance and also in facilitating initial antenna alignment and automatic beam re-adjustment during operation.

SUMMARY OF THE INVENTION

The objects set above are attained in the disclosed beam steerable communication apparatus comprising a focusing element with a focal plane, a plurality of antenna elements disposed on the focal plane of the focusing element, a beamforming network which has a plurality of antenna ports and a plurality of beamforming ports, at least one radio frequency transceiver capable to control the phase of carrier frequency signals on its independent outputs, and a baseband modem, wherein each antenna port of the beamforming network is coupled to at least one antenna element, each beamforming port of the beamforming network is coupled to an independent transceiver output, and the phase distribution law formed on the beamforming ports is determined by a baseband modem control commands to the transceivers, said phase distribution law is to combine or distribute signal power on all beamforming ports from or to at least one antenna port of the beamforming network, wherein each radio frequency transceiver includes at least a phase shifter, a Tx/Rx switch, LNA, PA, up and down-conversion mixers, LO generation circuit, receive power combining and transmit power distribution schemes.

In the communication apparatus according to the invention, the focusing element focuses the radiation from one of the antenna element in a certain direction, thus forming a narrow beam of the radiation pattern and providing a high gain value. Effective beam steering is achieved by arranging the antenna elements in a focal plane of the focusing element in different displacements relatively to its axis. In that case the radiation from antenna elements disposed in different displacements is focused in different directions. Power combining is achieved using the beamforming network which combines or distributes signal power on all beamforming ports from or to at least one antenna port depending on the formed phased distribution law on the beamforming ports. Thus, greater output powers are achieved with relaxed requirements to the transceivers linearity. It should be noted that in the disclosed invention the reciprocity of the beamfroming network is effectively used. For instance, in the prior art systems the beamforming network is used to form the proper phase distribution on the antenna elements depending of what single input is used to launch a signal, while in the disclosed apparatus vice a versa a phase distribution at the beamforming inputs provides feeding of single antenna element by one antenna output port of the beamforming network.

According to one embodiment of the disclosed communication apparatus, the beamforming network is a Butler matrix. This is one of the widely used reciprocal beamforming networks that provides power combing on one antenna port from all beamforming ports. In that case linear phase distribution laws with different increments are used at the beamforming ports of the Butler matrix.

According to another embodiment, the Butler matrix includes 3 dB couplers, phase shifters, and crossovers which are typical elements used for practical Butler matrix realization.

According to yet another embodiment, said beamforming network is realized on a semiconductor integrated circuit. It provides device miniaturization but can cause cost increase since larger IC area is required.

According to one more embodiment, the beamforming network is realized on a printed circuit board. In that case the network involves lower loss and production costs.

According to another embodiment, radio frequency transceivers are realized on at least one semiconductor integrated circuit (IC) component. In that case the transceiver ICs are mounted on a printed circuit providing effective assembly and device miniaturization.

According to other embodiments, said focusing element is selected from a group consisting of a parabolic reflector, a thin dielectric lens and a Luneburg lens. Those focusing elements are traditionally used in millimeter-wave high gain antennas.

According to yet another embodiment, said focusing element is a lens with a plane surface substantially coincide with a focal surface, on which antenna elements are disposed in different off-axis displacement of the lens. More particularly, the beamforming network, transceivers, and antenna elements are realized in one printed circuit board assembly, said assembly is mounted on the plane surface of the lens. In this preferred embodiment effective communication apparatus is provided requiring less components that decreases production costs.

According to one embodiment, antenna elements are microstrip antenna elements implemented on a printed circuit board. This embodiment covers all types of microstrip antenna elements which can be used depending on system requirements and the type of a focusing element.

According to another embodiment, antenna elements are horn antenna elements. This is preferred in some cases for increasing antenna radiation and aperture efficiencies.

In different embodiments of the invention, antenna elements are arranged either along one line or in 2D order in a focal plane of the focusing system. Consequently, the disclosed apparatus is able to provide 1D or 2D beam scanning. It is important to note that in the disclosed apparatus 1D beamforming network can be used for 2D beam steering that is not possible in considered prior art systems. In the latter case 2D beamforming networks are required for 2D beam steering but usually it implies a lot of difficulties for effective practical realization.

According to one embodiment, phase shifting is performed in RF region with signals on a carrier frequency. RF phase shifting has the advantage of higher dynamic range of the transceiver, but involves additional loss since the realization of a phase shifter in millimeter wave range is quite complicated.

According to another embodiment, phase shifting is performed in IF region with signals on IF or analog frequency. The phase shifters realization in this case is significantly relaxed but the architecture requires multiple up and down conversion mixers that can be cost ineffective. Also dynamic range of RF mixers should be high enough to accommodate probable strong interferences.

According to another embodiment, phase shifting is performed with LO signals in LO generating circuit. In that case phase shifter loss, non-linearity, and noise performance do not directly affect the transceiver performance. However, this architecture also requires large number of functional components.

According to yet another embodiment, phase shifting, power combining and power distribution are performed by a baseband modem in digital domain. This is the most effective but the least practical solution nowadays since it requires huge performance of ADC and DAC blocks.

According to yet another embodiment, the communication apparatus is adapted to provide high throughput communication in millimeter wave point-to-point or point-to-multipoint radio relay system and adapted to adjust the main antenna beam during initial antenna alignment procedure or in case of changes of antenna orientation. In particular, the communication apparatus can be adapted to operate in the frequency range of 71-86 GHz and to provide a half power beamwidth lower than 1° for each beam during scanning or to operate in the frequency range of 57-66 GHz and to provide a half power beamwidth lower than 3° for each beam during scanning Further features and advantages of the present invention will become apparent from the following description of the preferred embodiments with reference to accompanying drawings. Similar elements in the drawings are denoted by similar reference numerals.

DETAILED DESCRIPTION OF THE INVENTION

According to the invention, it is provided a high data rate communication apparatus with an antenna with high gain value and effective beam-scanning capability providing low loss and the capability to combine signal powers from different transceiver outputs without RF linearity degradation.

Figure 1:
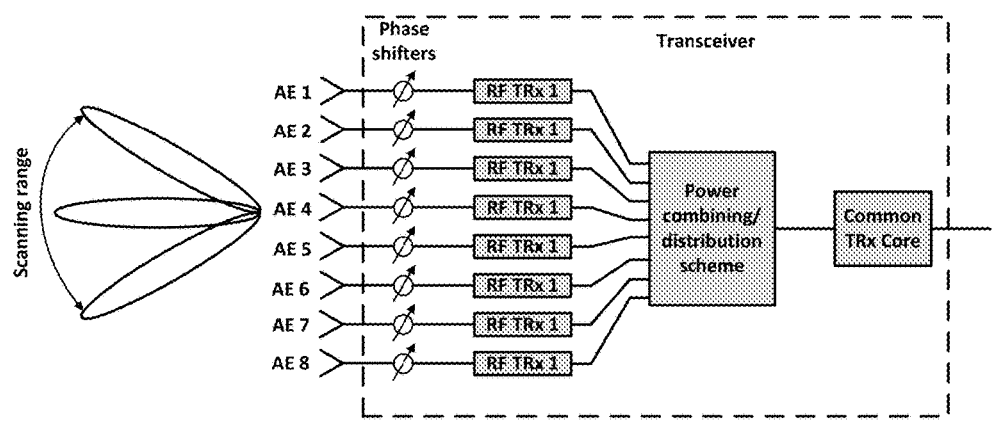
FIG. 1 shows a schematic structure of a known phased antenna array apparatus (prior art).
Figure 2:
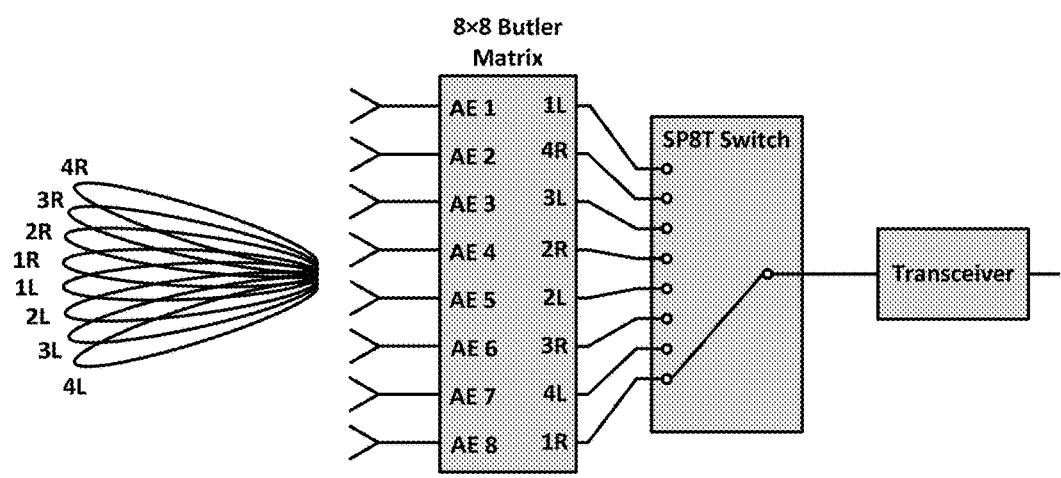
FIG. 2 shows a schematic structure of a known switched-beam antenna array apparatus with a beamforming network (prior art).
Figure 3:
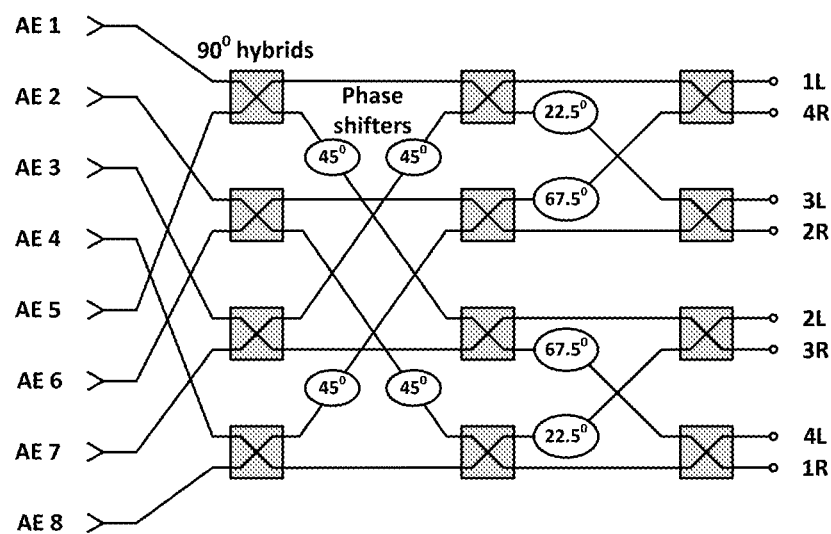
FIG. 3 illustrates a structure of an 8 by 8 Butler matrix (prior art).
Figure 4:
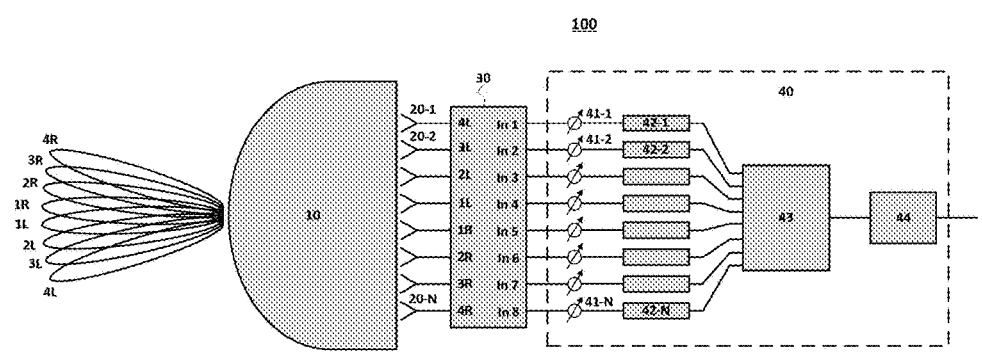
FIG. 4 presents a block structure of the high data rate beam steerable communication apparatus according to one of the preferred embodiments of the invention.

An example of a communication apparatus 100 according to the invention is presented in FIG. 4. The apparatus comprises a dielectric lens 10, a plurality of antenna elements 20-1 . . . 20-N which are primary antenna elements for a lens 10, a bemforming network 30 represented by a Butler matrix, and a transceiver block 40 with a plurality of outputs on which signal phases can be adjusted and controlled. Not shown (for clarity reasons) also a baseband modem which performs control of phase values of signals at each output of the transceiver block 40 through a control channels between the baseband modem and the transceiver block 40. In this example phase shifters 41-1 . . . 41-N operate with RF signals on a carrier frequency, radio frequency transceiver units 42-1 . . . 42-N perform amplification and up/down conversion of signals received or to be transmitted by the apparatus. Power combining/distributing block 43 operates in this example with signals on intermediate frequency that is low. Other necessary operations with intermediate low frequency signals are performed in a common transceiver core 44. The output of the transceiver core 44 is connected to a baseband modem through digital-to-analog and analog-to-digital blocks (not shown). In other examples, different transceiver architectures can be used retaining the main principle of adjusting signal phases in its outputs.

The Butler network 30 in the described example has 8 by 8 order (N=8) and performes combining (for the transmitting signal) of all the powers from the transceiver block 40 outputs in one of the antenna ports. Thus, the requirements to the radio frequency transceiver units 42-1 . . . 42-N linearity and output power are facilitated. For the receiver signal the Butler matrix 30 distributes the inputted signal to all the beamforming ports. After phase shifting and down-conversion all the signals are again combined for further demodulation. Thus, in the described example apparatus only one antenna element is used at a time, while all other are inactive. This principle of Butler matrix operation differs from that used in traditional antenna arrays where all antenna elements participate in transmission or reception of a signal.

Selection of an active feeding antenna element in the disclosed apparatus is determined by predefined phase distribution laws set by a transceiver block on the beamforming ports of the Butler matrix. Typically these laws are a set of linear functions with different increment values between neighboring ports. The phase distribution laws should be supported by the transceiver functionality and controlled by a modem commands through dedicated control channels.

A further advantage of the described embodiment of the communication apparatus shown in FIG. 4 is in providing of beam switching in an antenna with almost unlimited gain value. That gain value is determined only by the lens aperture size. Beam scanning in that case is provided by feeding of different antenna elements disposed in a predefined arrangement relatively to the lens axis. This is also important that 1D Butler matrix can be used to provide 2D beam scanning (easily by corresponding 2D antenna elements arrangement) that is not possible in prior art antenna arrays.

There is a variety of possible practical realizations of the disclosed communication apparatus. In one example, the transceiver block can be realized on one or on a plurality of RFICs which can be mounted on a printed circuit board forming a PCB assembly. Moreover, the Butler matrix can be realized either on a PCB or in separate RFIC component or integrated together with a transceiver RFIC. In one of the preferred embodiments antenna elements are realized on the same PCB assembly, for example, as microstrip antenna elements. However, it is apparent that on-chip antenna elements realization is also possible in some dedicated applications.

All the elements and components of the apparatus in the described example are known from the prior art and can be implemented using known PCB and IC technologies even in millimeter wave band.

Figure 5:
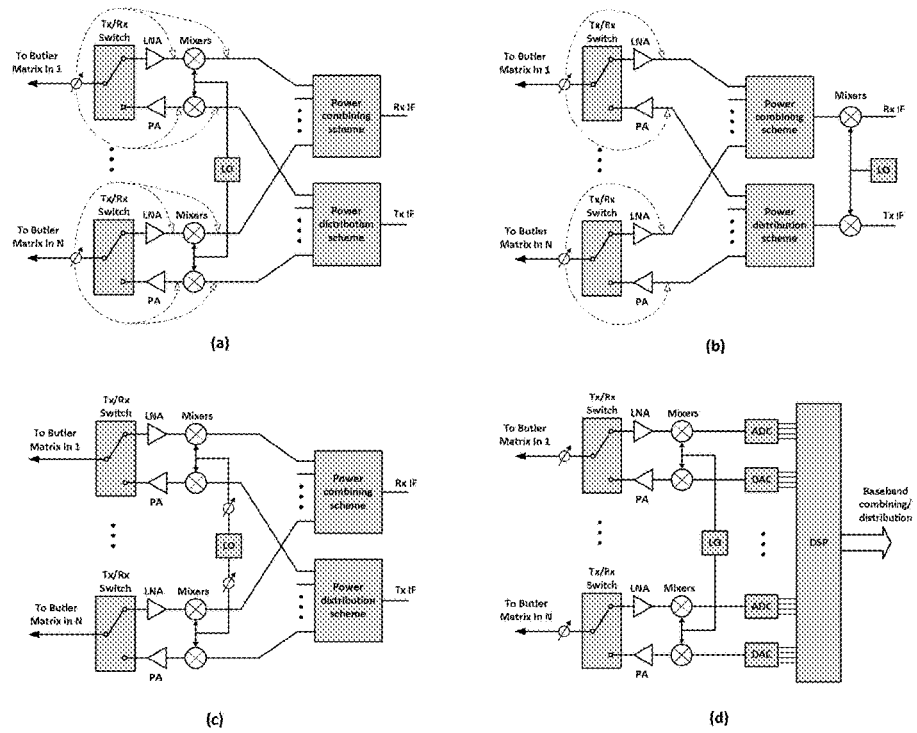
FIGS. 5a-d show different schemes of transceiver architectures capable of shifting and controlling phases of the output signals: a) Architecture with multiple mixers and RF or IF phase shifting; b) Architecture with single block of up and down-conversion mixers and RF phase shifting; c) Architecture with phase shifting in LO generation path; d) Architecture with phase shifting and combining/distributing block in the digital domain.

FIGS. 5a-d shows schematics of different known multi-output transceiver architectures which can be used in the disclosed communication apparatus forming a transceiver block. All these architectures are able to provide phase shifting on its outputs. FIG. 5a presents an architecture with multiple mixers and RF or IF phase shifting; FIG. 5b—an architecture with single block of up and down-conversion mixers and RF phase shifting; FIG. 5c—an architecture with phase shifting in LO generation path; and FIG. 5d—an architecture with phase shifting and combining/distribution block in the digital domain. All described architectures employ Tx/Rx switches to be able to operate in time division duplexing mode for simultaneous signal transmission and reception. Phased outputs of the transceiver block are connected to beamforming ports of the beamforming network.

Figure 6:
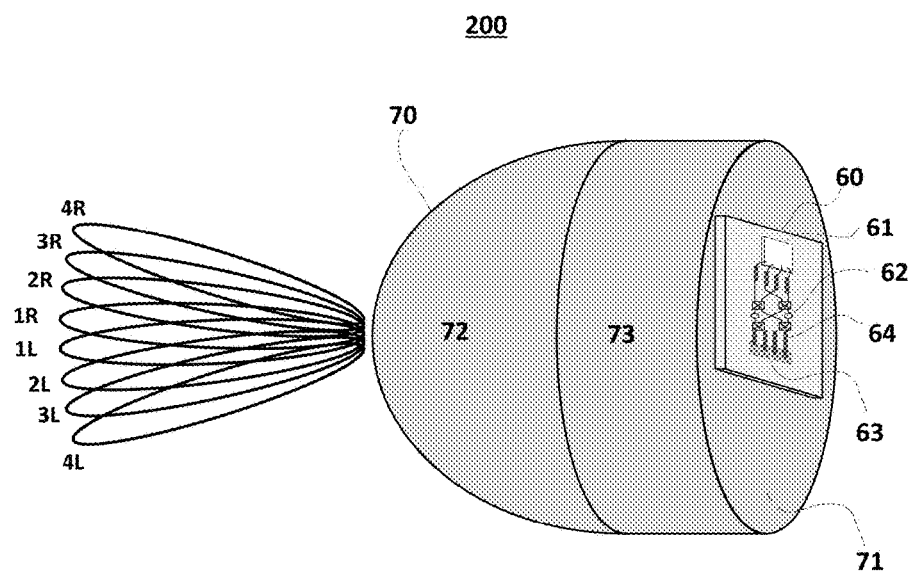
FIG. 6 shows a communication apparatus with steerable integrated lens antenna and a PCB assembly with transceivers and a Butler matrix according to one embodiment of the invention.

FIG. 6 depicts a communication apparatus 200 according to one of the preferred embodiments of the invention. The apparatus 200 comprises a steerable integrated lens antenna and a PCB assembly 60 with transceivers 61 and a Butler matrix 62. The advantage of that type of antenna is in integration of antenna elements 63 on the back focal plane 71 of a dielectric lens 70. The lens 70 is made of homogeneous dielectric material and has a collimating portion 72 and an extension portion 73. The collimating portion 72 can have an elliptical or hemispherical shape while an extension shape 73 can be modified in different ways to facilitate assembling of the antenna with a housing. In the shown example the PCB assembly 60 mounted on the lens 70 comprises antenna elements 63, a Butler matrix 62, a transceiver chip 61 and transmission lines 64 to couple the components with each other. The transceiver 61 can be realized also as a plurality of RFIC components mounted on the PCB assembly 60 using wire bonding or flip-chip technologies. Antenna elements 63 can be represented by microstrip patch elements (like in the shown example in FIG. 6) or by any other known planar antenna elements, such as, without limitation, slot and double slot radiators, monopoles, dipoles, spiral radiators, etc. It is also apparent that different types of thin lenses, Luneburg lenses, and dish reflectors can be used instead of an integrated lens antenna.

The described preferred embodiments show the advantages of the disclosed communication apparatus. Namely, the apparatus is capable of providing efficient beam steering with high gain antennas with all the prospect features of phased antenna arrays, such as the ability to combine/distribute signal power between several RF amplifiers, thus, facilitating linearity requirements and increasing an output power of a transmitter.

The communication apparatus according to any of the disclosed embodiments can be used in various millimeter wave radio communication applications, in particular in radio relay point-to-point communication systems with frequency ranges of 57-66 GHz, 71-76/81-86 GHz, 92-95 GHz, in radars with frequency ranges near 77 GHz and 94 GHz, etc. In various embodiments, the apparatus according to the invention is able to provide half-power beam width of less than 3° or less than 1° by implementing an antenna with an aperture of corresponding size.

The present invention is not limited to specific embodiments described in the present disclosure by way of example only; the invention encompasses all modifications and variations without departing from the spirit and scope of the invention set forth in the accompanying claims.

The invention claimed is:

1. A beam steerable communication apparatus comprising:
   a focusing element with a focal plane,
   a plurality of antenna elements disposed on the focal plane of the focusing element,
   a beamforming network which has a plurality of antenna ports and a plurality of beamforming ports,
   at least one radio frequency transceiver capable to control a phase of carrier frequency signals on its independent output, and
   a baseband modem,
   wherein, in said apparatus:
   each antenna port of the beamforming network is coupled to at least one antenna element,
   each beamforming port of the beamforming network is coupled to an independent output of a corresponding one of the at least one radio frequency transceiver, and
   wherein:
   a phase distribution formed on the beamforming ports is determined by baseband modem control commands to the at least one radio frequency transceiver, and
   the beamforming network is adapted to combine or distribute signal power on all beamforming ports from or to at least one antenna port in accordance with said phase distribution,
   wherein each radio frequency transceiver includes at least a phase shifter, a Tx/Rx switch, LNA, PA, up and down-conversion mixers, LO generation circuit, receive power combining and transmit power distribution devices.

2. The apparatus of claim 1, wherein said beamforming network is a Butler matrix.

3. The apparatus of claim 2, wherein the Butler matrix includes 3 dB couplers, phase shifters, and crossovers.

4. The apparatus of claim 1, wherein said beamforming network is realized on a semiconductor integrated circuit.

5. The apparatus of claim 1, wherein said beamforming network is realized on a printed circuit board.

6. The apparatus of claim 1, wherein radio frequency transceivers are realized as at least one semiconductor integrated circuit component.

7. The apparatus of claim 1, wherein said focusing element is selected from a group consisting of a parabolic reflector, a thin dielectric lens and a Luneburg lens.

8. The apparatus of claim 1, wherein said focusing system is a lens with a plane surface substantially coincide with a focal surface, on which antenna elements are disposed in different off-axis displacement of the lens.

9. The apparatus of claim 1, wherein the beamforming network, transceivers, and antenna elements are realized in one printed circuit board assembly.

10. The apparatus of claim 9, wherein said printed circuit board assembly is mounted on the plane surface of the lens.

11. The apparatus of claim 1, wherein antenna elements are microstrip antenna elements implemented on a printed circuit board.

12. The apparatus of claim 1, wherein antenna elements are horn antenna elements.

13. The apparatus of claim 1, wherein antenna elements are arranged along one line in a focal plane of the focusing element.

14. The apparatus of claim 1, wherein antenna elements are arranged in 2D order in a focal plane of the focusing element.

15. The apparatus of claim 1, wherein phase shifting in each transceiver output is performed in RF region with signals on a carrier frequency.

16. The apparatus of claim 1, wherein phase shifting in each transceiver output is performed in IF region with signals on IF or analog frequency.

17. The apparatus of claim 1, wherein phase shifting in each transceiver output is performed with LO signals in LO generating circuit.

18. The apparatus of claim 1, wherein phase shifting, power combining and power distribution are performed in digital domain.

19. The apparatus of claim 1 adapted to provide high throughput communication in millimeter wave point-to-point or point-to-multipoint radio relay system and adapted to adjust the main antenna beam during initial antenna alignment procedure or in case of changes of antenna orientation.

* * * * *